US011453485B2

(12) United States Patent
Baskin

(10) Patent No.: US 11,453,485 B2
(45) Date of Patent: Sep. 27, 2022

(54) ROTOR SYSTEM WITH A U-SHAPED BEAM MEMBER

(71) Applicant: LOCKHEED MARTIN CORPORATION, Bethesda, MD (US)

(72) Inventor: Bryan Kenneth Baskin, Arlington, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 261 days.

(21) Appl. No.: 16/390,615

(22) Filed: Apr. 22, 2019

(65) Prior Publication Data

US 2020/0331599 A1 Oct. 22, 2020

(51) Int. Cl.
*B64C 27/48* (2006.01)
*B64C 27/12* (2006.01)
*B64C 27/473* (2006.01)

(52) U.S. Cl.
CPC .............. *B64C 27/48* (2013.01); *B64C 27/12* (2013.01); *B64C 2027/4736* (2013.01)

(58) Field of Classification Search
CPC ......... B64C 27/12; B64C 27/14; B64C 27/37; B64C 27/48; B64C 2027/4736
See application file for complete search history.

(56) References Cited

U.S. PATENT DOCUMENTS

| 4,419,051 A | 12/1983 | Derosa | |
| 4,549,852 A | 10/1985 | Hibyan | |
| 4,915,585 A * | 4/1990 | Guimbal | B64C 27/51 416/107 |
| 5,181,829 A | 1/1993 | Pancotti | |
| 7,850,429 B2 * | 12/2010 | Pancotti | B64C 27/32 416/131 |
| 10,703,461 B2 * | 7/2020 | Cravener | B64C 3/56 |
| 2018/0162519 A1 | 6/2018 | Parham, Jr. et al. | |
| 2019/0016456 A1 * | 1/2019 | Dearman | F16D 3/76 |

* cited by examiner

*Primary Examiner* — Richard R. Green
*Assistant Examiner* — Ashesh Dangol
(74) *Attorney, Agent, or Firm* — Foley & Lardner LLP

(57) ABSTRACT

A rotor system for a rotary wing aircraft includes a rotor hub including a first beam attachment member and a second beam attachment member. A hub arm including a U-shaped beam member is connected to the rotor hub. The U-shaped beam member includes a first end portion, a second end portion and an intermediate section connecting the first and second end portions. The first end portion is connected at the first beam attachment member. The second end portion is connected at the second beam attachment member. A pitch change bearing is mounted between the first and second beam attachment member through the first end portion and the second end portion.

17 Claims, 4 Drawing Sheets

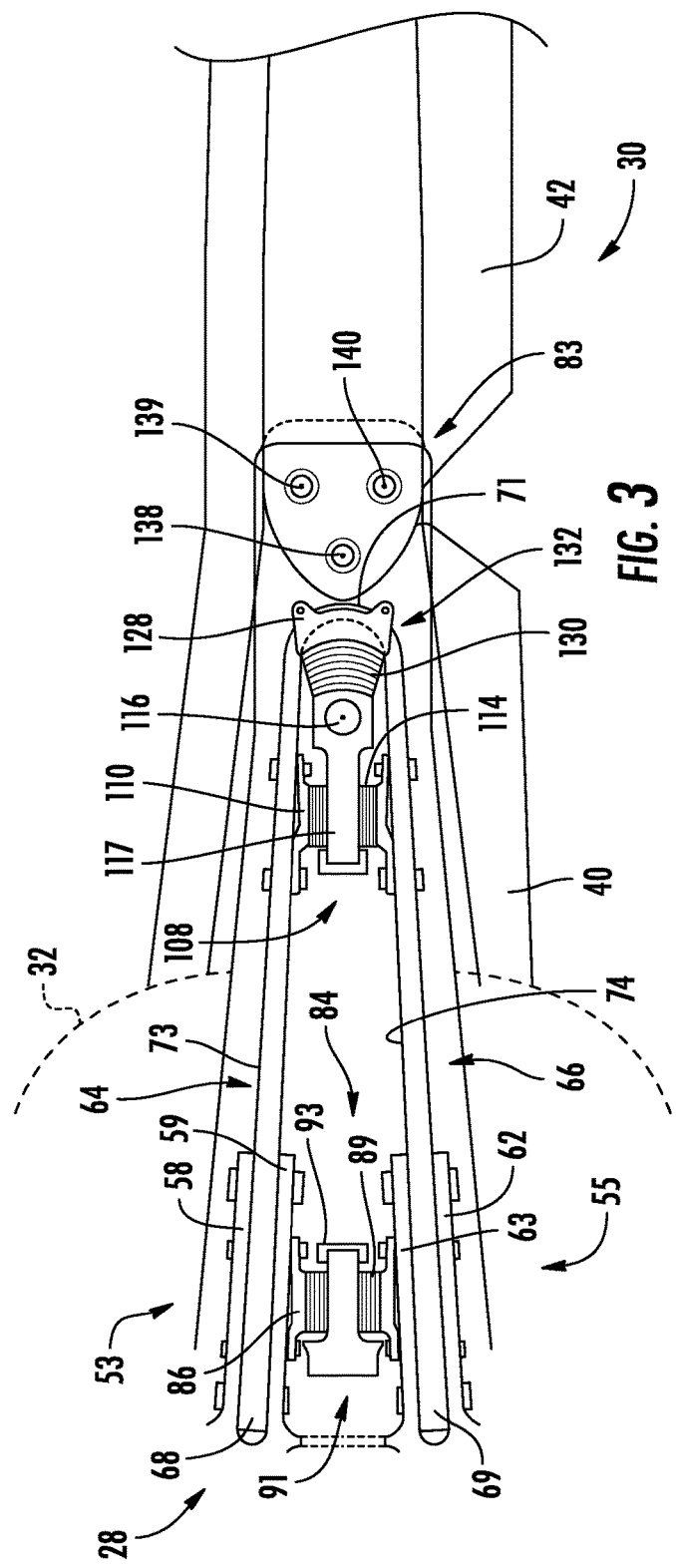
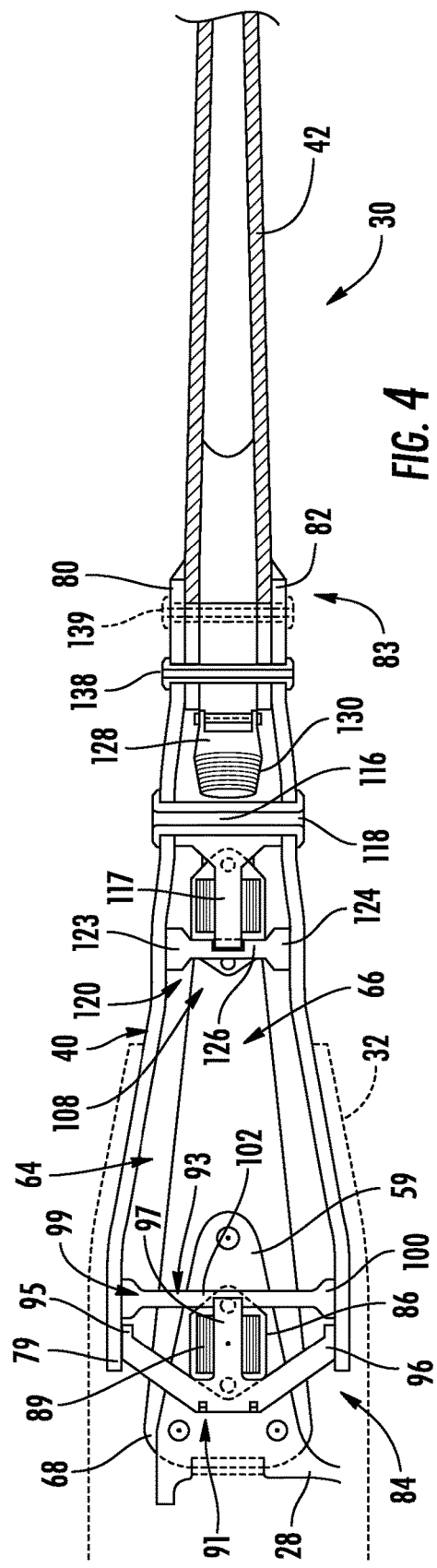

ROTOR SYSTEM WITH A U-SHAPED BEAM MEMBER

BACKGROUND

The subject matter disclosed herein generally relates to the art of rotary wing aircraft and, more particularly, to a U-beam rigid rotor hub assembly for a folding rotor blade.

In typical rigid helicopter rotors, a beam extends from a hub member and is connected to a torque tube and blade via a bolted joint at, for example, a midspan of the rotor. The joint comprises a pattern of two or more fasteners. In some rotors four or six fasteners, such as bolts, extend through the torque tube, rotor blade and beam at the midspan. The joint is utilized to restrict relative motion of the torque tube, rotor blade and beam. The joint also provides a load path for loads acting on the rotor blade to be transmitted to the flex-beam and then into the hub member.

The beam is typically formed from a material that is capable of supporting loads associated with flight. The beam also supports pitch change bearings and a blade fold hinge. The materials used to support flight loads, fasteners needed to connect bearings and the blade fold hinge all contribute to an overall weight of the blade. As rotor spans are made smaller, it manufactures would be open to rigid rotor hub systems that are both lightweight and possess a low part count to support modern rotorcraft systems.

BRIEF DESCRIPTION

According to an embodiment, a rotor system for a rotary wing aircraft includes a rotor hub including a first beam attachment member and a second beam attachment member. A hub arm including a U-shaped beam member is connected to the rotor hub. The U-shaped beam member includes a first end portion, a second end portion and an intermediate section connecting the first and second end portions. The first end portion is connected at the first beam attachment member. The second end portion is connected at the second beam attachment member. A pitch change bearing is mounted between the first and second beam attachment member through the first end portion and the second end portion.

In addition to one or more of the features described above, or as an alternative, in further embodiments a centrifugal force (CF) bearing arranged at the intermediate section of the U-shaped beam member.

In addition to one or more of the features described above, or as an alternative, in further embodiments the intermediate section of the U-shaped beam member defines a loop end, the CF bearing nesting within the loop end of the U-shaped beam member.

In addition to one or more of the features described above, or as an alternative, in further embodiments a blade cuff connected to the rotor hub and extending over the U-shaped beam member, the blade cuff including a first end connected to the pitch change bearing and a second end, the second end defining a blade fold joint.

In addition to one or more of the features described above, or as an alternative, in further embodiments a CF pin extending through the blade cuff spaced from the second end, the CF pin being connected to the CF bearing.

In addition to one or more of the features described above, or as an alternative, in further embodiments a blade cuff attachment member joining the first end of the blade cuff to the pitch change bearing.

In addition to one or more of the features described above, or as an alternative, in further embodiments the blade cuff attachment member is spaced from the rotor hub by an electronics receiving zone.

In addition to one or more of the features described above, or as an alternative, in further embodiments the U-shaped beam member is formed from one or more of a graphite composite, graphite epoxy, and mixtures of graphite and fiberglass in epoxy.

According to another aspect of an exemplary embodiment, a rotary wing aircraft includes a fuselage, at least one prime mover supported in the fuselage, and a rotor system operatively connected to the at least one prime mover. The rotor system includes a rotor hub including a first beam attachment member and a second beam attachment member. A hub arm including a U-shaped beam member is connected to the rotor hub. The U-shaped beam member includes a first end portion, a second end portion, and an intermediate section connecting the first and second end portions. The first end portion is connected at the first beam attachment member and the second end portion is connected at the second beam attachment member. A pitch change bearing is mounted between the first and second beam attachment member through the first end portion and the second end portion.

In addition to one or more of the features described above, or as an alternative, in further embodiments a centrifugal force (CF) bearing arranged at the intermediate section of the U-shaped beam member.

In addition to one or more of the features described above, or as an alternative, in further embodiments the intermediate section of the U-shaped beam member defines a loop end, the CF bearing nesting within the loop end of the U-shaped beam member.

In addition to one or more of the features described above, or as an alternative, in further embodiments a blade cuff connected to the rotor hub and extending over the U-shaped beam member, the blade cuff including a first end connected to the pitch change bearing and a second end, the second end defining a blade fold joint.

In addition to one or more of the features described above, or as an alternative, in further embodiments a CF pin extending through the blade cuff spaced from the second end, the CF pin being connected to the CF bearing.

In addition to one or more of the features described above, or as an alternative, in further embodiments a rotor blade connected to the blade cuff at the blade fold joint.

In addition to one or more of the features described above, or as an alternative, in further embodiments the U-shaped beam member is formed from a one or more of a graphite composite, graphite epoxy, and mixtures of graphite and fiberglass in epoxy.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF DRAWINGS

The following descriptions should not be considered limiting in any way. With reference to the accompanying drawings, like elements are numbered alike:

FIG. 3 depicts a partially cut-away top view of the rotor system of FIG. 3, in accordance with an aspect of an exemplary embodiment; and FIG. 4 depicts a partially cut-away side view of a rotor system of FIG. 2, in accordance with an aspect of an exemplary embodiment.

DETAILED DESCRIPTION

Figure 1A:
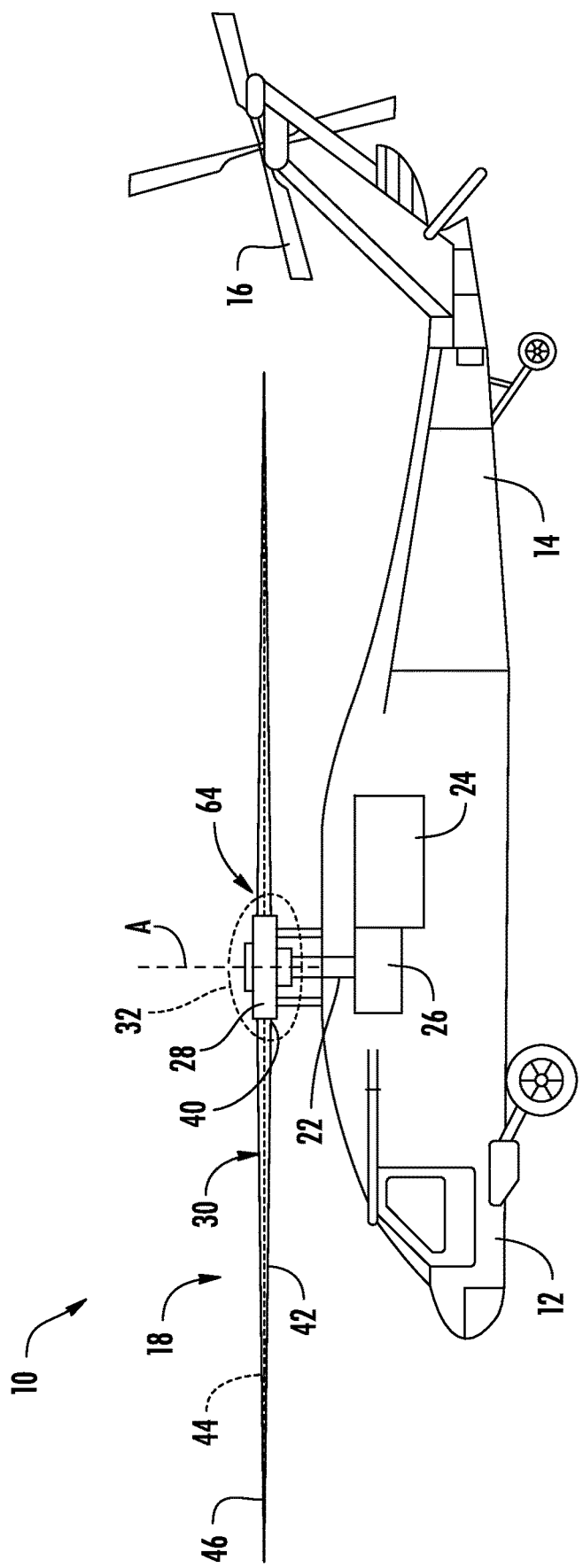
FIG. 1A depicts a rotary wing aircraft including a rotor system having a U-shaped beam member, in accordance with an aspect of an exemplary embodiment.
Figure 1B:
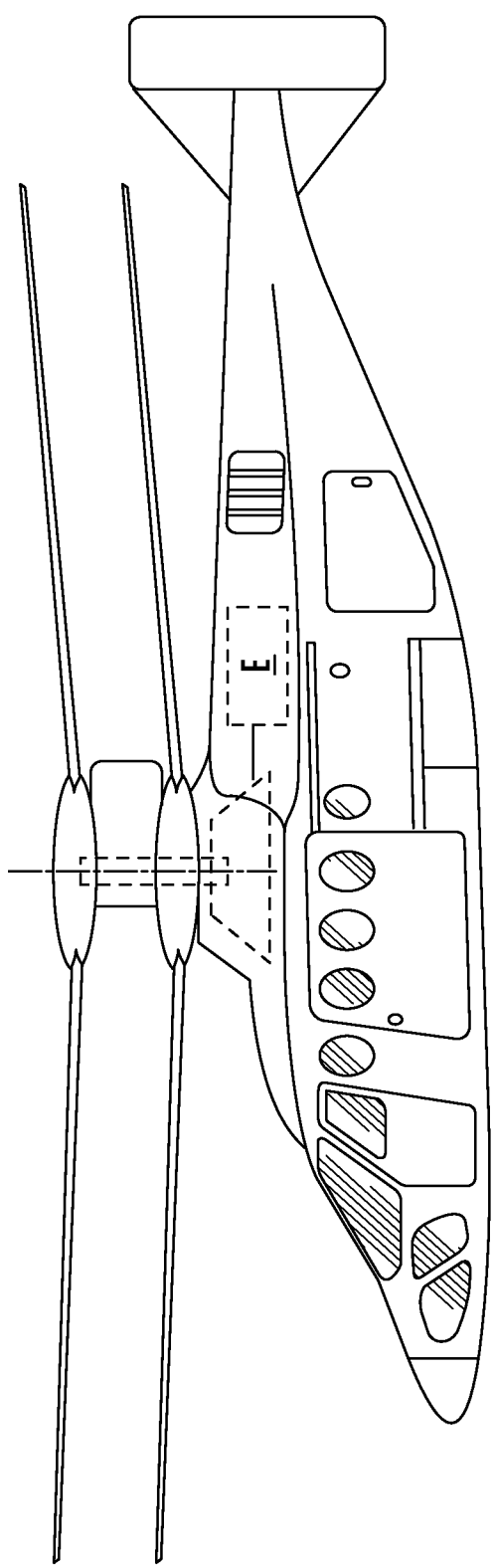
FIG. 1B depicts a rotary wing aircraft including a coaxial rotor system having a U-shaped beam member, in accordance with an aspect of an exemplary embodiment

Shown in FIG. 1A is a schematic view of an embodiment of an aircraft, in this embodiment a rotary wing aircraft shown in the form of a helicopter 10. Helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft, including rotorcraft having coaxial rotor assembles such as shown in FIG. 1B. A main rotor system 18 is located at the airframe 12 and rotates about a main rotor axis A.

Main rotor system 18 is driven by a drive shaft 22 connected to a prime mover, for example, an engine 24 by a gearbox 26. It should be understood that the number and type of prime movers employed by helicopter 10 may vary. Main rotor system 18 includes a rotor hub 28 located at the main rotor axis A and operably connected to drive shaft 22. A plurality of rotor blade assemblies, one of which is indicated at 30 is connected to the rotor hub 28. A fairing 32 extends about rotor hub 28 and a portion of each rotor blade assembly 30. In the embodiment shown, each rotor blade assembly 30 includes a blade cuff 40. A rotor blade 42 has an airfoil-shaped cross section and is secured to blade cuff 40. Rotor blade 42 extends radially along a blade axis 44 to a blade tip 46 bout which blade 42 pitches.

Figure 2:
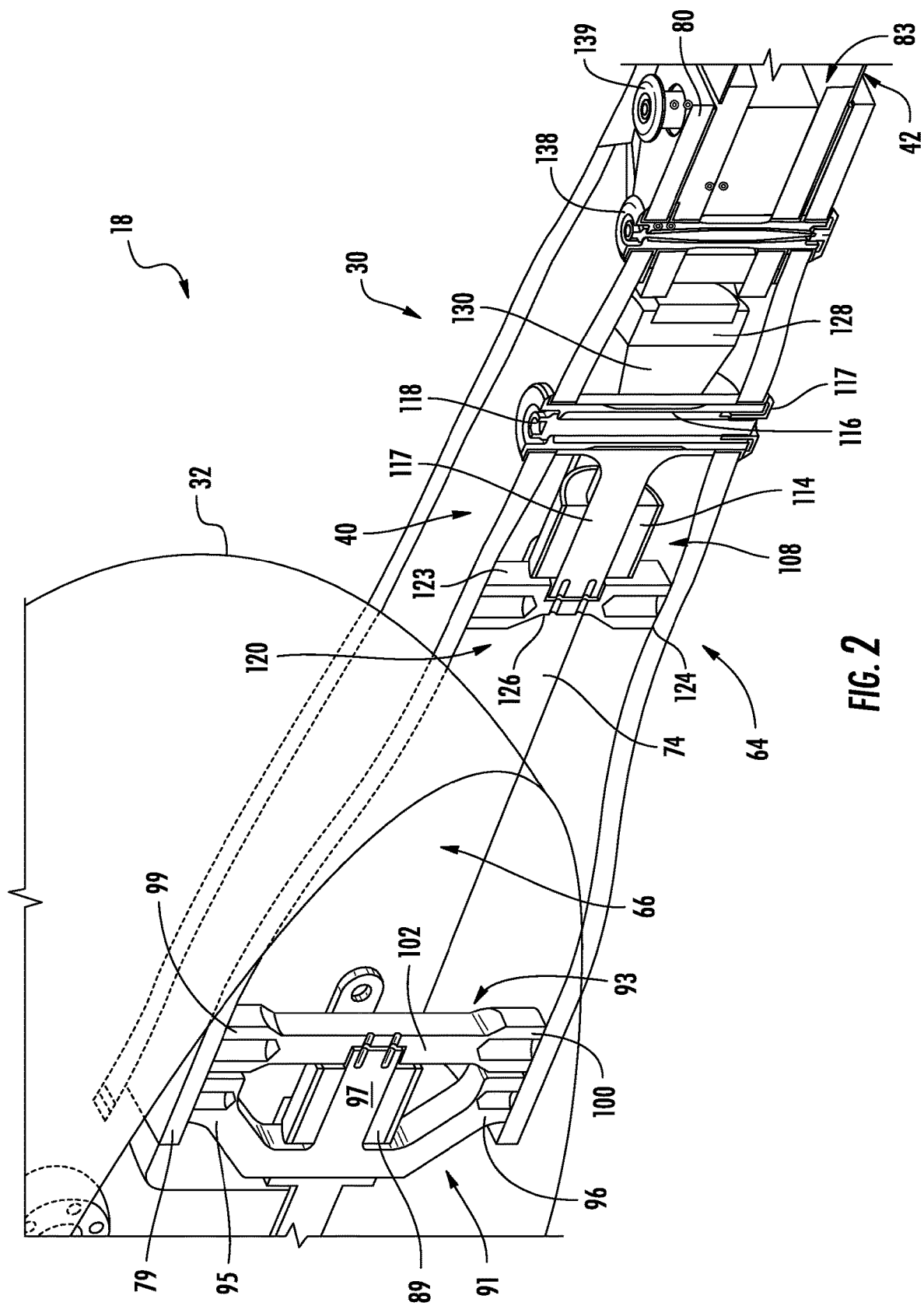
FIG. 2 depicts a partially cut-away view of a rotor hub of the rotary wing aircraft of FIG. 1A or FIG. 1B, in accordance with an aspect of an exemplary embodiment.

Reference will now follow to FIGS. 2-4 in describing one of rotor blade assemblies 30 with an understanding that others of rotor blade assemblies 30 include similar structure. Rotor hub 28 includes a first beam attachment member 53 (FIG. 3) and a second beam attachment member 55. First beam attachment member 53 includes a first attachment element 58 and a second attachment element 59. First and second attachment elements 58 and 59 project radially outwardly of rotor hub 28 and are spaced one from another by a first beam receiving gap (not separately labeled). Second beam attachment member 55 includes a third attachment element 62 and a fourth attachment element 63. Third and fourth attachment elements 62 and 63 project radially outwardly of rotor hub 28 and are spaced one from another by a second beam receiving gap (also not separately labeled).

In an embodiment, hub arm 64 is connected to rotor hub 28 at first and second beam attachment members 53 and 54. Hub arm 64 includes a U-shaped beam member 66 is connected to rotor hub 28 through first and second beam attachment members 53 and 55. U-shaped beam member 66 may be formed from a graphite composite, graphite epoxy, mixtures of graphite and fiberglass in epoxy and includes a first end portion 68, a second end portion 69, and an intermediate section 71. U-shaped beam member 66 also includes an outer surface 73 and an inner surface 74. Hub arm 64 is coupled to blade cuff 40. Blade cuff 40 includes a first end 79 and a second end 80. Second end 80 defines a blade fold joint 83 for rotor blade 42.

In an embodiment, a pitch change bearing 84 is arranged in U-shaped beam member 66 proximate to rotor hub 28. Pitch change bearing 84 includes a support 86 connected to first attachment element 59 and fourth attachment element 63. An elastomeric member 89 is arranged within, and connected to, support 86. An inboard bearing element 91 is connected to elastomeric member 89 and blade cuff 40. An inboard beam 93 is slidingly connected to inboard bearing element 91 and blade cuff 40 to help transmit load between the two.

Inboard bearing element 91 includes a first leg 95 that is secured to blade cuff 40, and a third leg 97 that is receptive of inboard beam 93. Inboard beam 93 includes a first end 99 that is connected to an inner surface (not separately labeled) blade cuff 40, a second end 100 connected to the inner surface of blade cuff 40 opposite of first end 99, and an intermediate portion 102 that is received by third leg 97 of inboard bearing element 91.

In an embodiment, a centrifugal force (CF) bearing 108 is arranged in U-shaped beam member 66 spaced from pitch change bearing 84. CF bearing 108 reacts to centrifugal force created as blade 42 rotates about main rotor axis A. CF bearing 108 includes a support member 110 connected to inner surface 74 proximate to intermediate section 71. An elastomeric member 114 is connected to support member 110 and A CF pin 116 extends into elastomeric member 114.

Specifically, CF pin 116 includes a leg member 117 that extends into elastomeric member 114. CF pin 116 extends within, and is secured to, blade cuff 40 with a fastener 118. An outboard beam 120 is slideably connected to leg member 117. Outboard beam 120 includes a first end section 123 connected to blade cuff 40, a second end section 124 connected to an opposing surface (not separately labeled) of blade cuff 40, and an intermediate section 126 that is received by leg member 117.

In an embodiment, U-shaped beam member 66 includes a CF bearing support 128 having an elastomeric element 130 that is connected with CF pin 116. CF pin 116 carries centrifugal force from blade cuff 40 to elastomeric bearing 130 and transmits vertical and horizontal shear into elastomeric pitch change bearing 114. CF bearing support 128 is nested in, and connected with a loop end 132 of U-shaped beam member 66 defined by intermediate section 71 inboard of blade fold joint 83. In the embodiment shown, rotor blade 42 is connected hub arm 64 at blade fold joint 83. First, second, and third mechanical fasteners 138, 139 and 140 connect rotor blade 42 at blade fold joint 83. With this arrangement, two of mechanical fasteners 138, 139, and 140 may be removed allowing rotor blade 42 to be folded toward rotor hub 28.

It should be understood that the exemplary embodiments describe a rigid blade system that is designed to withstand and support centrifugal loading due to forces perceived during operation of main rotor system 18 yet also be capable of folding. The use of U-shaped beam member allows hub arms to be lightweight, possess few components, and include a central hub length that is no more than about 24-inches (61-centimeters).

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor system for a rotary wing aircraft comprising:
   a rotor hub including a first beam attachment member and a second beam attachment member;
   a hub arm including a U-shaped beam member connected to the rotor hub, the U-shaped beam member including a first end portion, a second end portion and an intermediate section connecting the first and second end portions, the first end portion being connected at the first beam attachment member and the second end portion being connected at the second beam attachment member;
   a pitch change bearing mounted between the first and second beam attachment member through the first end portion and the second end portion; and
   a centrifugal force (CF) bearing arranged within the U-shaped beam member, the CF bearing including a support member connected to an inner surface of the U-shaped beam member, wherein an elastomeric member is connected to the support member, the support member and the elastomeric member being spaced from the intermediate section.

2. The rotor system according to claim 1, wherein the CF bearing is arranged at the intermediate section of the U-shaped beam member.

3. The rotor system according to claim 2, wherein the intermediate section of the U-shaped beam member defines a loop end, the CF bearing nesting within the loop end of the U-shaped beam member.

4. The rotor system according to claim 2, further comprising: a blade cuff connected to the rotor hub and extending over the U-shaped beam member, the blade cuff including a first end connected to the pitch change bearing and a second end, the second end defining a blade fold joint.

5. The rotor system according to claim 4, further comprising: a CF pin extending through the blade cuff spaced from the second end, the CF pin being connected to the CF bearing.

6. The rotor system according to claim 4, further comprising: a blade cuff attachment member joining the first end of the blade cuff to the pitch change bearing.

7. The rotor system according to claim 6, wherein the blade cuff attachment member is spaced from the rotor hub by an electronics receiving zone.

8. The rotor system according to claim 1, wherein the U-shaped beam member is formed from one or more of a graphite composite, graphite epoxy, and mixtures of graphite and fiberglass in epoxy.

9. The rotor system of claim 1, wherein the first end portion and the second end portion of the U-shaped beam member are disposed inboard of the intermediate portion.

10. The rotor system of claim 1, wherein the intermediate section is integrally formed with each of the first end portion and the second end portion.

11. A rotary wing aircraft comprising:
    a fuselage;
    at least one prime mover supported in the fuselage;
    a rotor system operatively connected to the at least one prime mover, the rotor system comprising:
    a rotor hub including a first beam attachment member and a second beam attachment member;
    a hub arm including a U-shaped beam member connected to the rotor hub, the U-shaped beam member including a first end portion, a second end portion and an intermediate section connecting the first and second end portions, the first end portion being connected at the first beam attachment member and the second end portion being connected at the second beam attachment member;
    a pitch change bearing mounted between the first and second beam attachment member through the first end portion and the second end portion; and
    a centrifugal force (CF) bearing arranged within the U-shaped beam member, the CF bearing including a support member connected to an inner surface of the U-shaped beam member, wherein an elastomeric member is connected to the support member, the support member and the elastomeric member being spaced from the intermediate section.

12. The rotor system according to claim 11, wherein the CF bearing is arranged at the intermediate section of the U-shaped beam member.

13. The rotor system according to claim 12, wherein the intermediate section of the U-shaped beam member defines a loop end, the CF bearing nesting within the loop end of the U-shaped beam member.

14. The rotor system according to claim 12, further comprising: a blade cuff connected to the rotor hub and extending over the U-shaped beam member, the blade cuff including a first end connected to the pitch change bearing and a second end, the second end defining a blade fold joint.

15. The rotor system according to claim 14, further comprising: a CF pin extending through the blade cuff spaced from the second end, the CF pin being connected to the CF bearing.

16. The rotor system according to claim 14, further comprising: a rotor blade connected to the blade cuff at the blade fold joint.

17. The rotor system according to claim 11, wherein the U-shaped beam member is formed from a one or more of a graphite composite, graphite epoxy, and mixtures of graphite and fiberglass in epoxy.

* * * * *